United States Patent
Sawai

(10) Patent No.: US 10,422,259 B2
(45) Date of Patent: Sep. 24, 2019

(54) EXHAUST PIPE STRUCTURE

(71) Applicant: TOYOTA JIDOSHA KABUSHIKI KAISHA, Toyota-shi (JP)

(72) Inventor: Osamu Sawai, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 85 days.

(21) Appl. No.: 15/726,524

(22) Filed: Oct. 6, 2017

(65) Prior Publication Data

US 2018/0106171 A1 Apr. 19, 2018

(30) Foreign Application Priority Data

Oct. 17, 2016 (JP) .................... 2016-203697

(51) Int. Cl.
*F01N 3/00* (2006.01)
*F01N 13/08* (2010.01)

(52) U.S. Cl.
CPC ............. *F01N 3/005* (2013.01); *F01N 13/08* (2013.01); *F01N 2240/22* (2013.01); *F01N 2470/20* (2013.01); *Y02T 10/20* (2013.01)

(58) Field of Classification Search
CPC ...... F01N 13/08; F01N 3/005; F01N 2240/22; F01N 2470/20; Y02T 10/20
See application file for complete search history.

(56) References Cited

U.S. PATENT DOCUMENTS

2008/0185133 A1   8/2008   Mabuchi et al.

FOREIGN PATENT DOCUMENTS

| JP | 2001-303947 A | | 10/2001 |
|----|---------------|---|---------|
| JP | 2008-189162 A | | 8/2008 |
| JP | 2011-189160 A | | 9/2011 |
| JP | 2011169160 A | * | 9/2011 |
| JP | 2012-188933 A | | 10/2012 |
| JP | 2015-158149 | | 9/2015 |

OTHER PUBLICATIONS

Machine Translation JP 2011169160 A (Osawa) (Year: 2011).*

* cited by examiner

*Primary Examiner* — Brandon D Lee
(74) *Attorney, Agent, or Firm* — Oblon, McClelland, Maier & Neustadt, L.L.P.

(57) ABSTRACT

An exhaust pipe structure includes a first pipe portion, a second pipe portion, and a third pipe portion. The first pipe portion is arranged below a floor panel of the vehicle, and extends in a horizontal direction in a vehicle side view. The second pipe portion communicates with a front end of the first pipe portion, and has a bottom portion recessed downward below a lower end of the front end and a top portion protruding downward below an upper end of the front end. The third pipe portion communicates with a rear end of the first pipe portion, and has a bottom portion recessed downward below a lower end of the rear end and a top portion protruding downward below an upper end of the rear end.

16 Claims, 3 Drawing Sheets

EXHAUST PIPE STRUCTURE

INCORPORATION BY REFERENCE

The disclosure of Japanese Patent Application No. 2016-203697 filed on Oct. 17, 2016 including the specification, drawings and abstract is incorporated herein by reference in its entirety.

BACKGROUND

1. Technical Field

The disclosure relates to an exhaust pipe structure.

2. Description of Related Art

An exhaust pipe structure is disclosed in Japanese Unexamined Patent Application Publication No. 2015-158149 (JP 2015-158149 A). The exhaust pipe structure has an exhaust pipe that extends rearward of a vehicle and bends convex downward in a vehicle side view, thereby forming an inclined portion having an upslope rearward of the vehicle, and a rear muffler that communicates with a rear end portion of the inclined portion. In the exhaust pipe structure, the inclined portion of the exhaust pipe is divided into two channels, and an on-off valve is disposed inside the rear muffler.

SUMMARY

In the exhaust pipe structure in JP 2015-158149 A, closing the on-off valve inside the rear muffler blocks one of the two channels, thereby reducing the channel cross-sectional area. Accordingly, the exhaust How rate of exhaust gas is increased, and an ability to discharge condensed water pooling in the exhaust pipe due to condensation of water vapor in the exhaust gas is improved.

The exhaust pipe structure in JP 2015-158149 A uses the structure dividing the exhaust pipe into two channels and the on-off valve blocking one of the two channels, thereby baying a complex structure.

The disclosure provides an exhaust pipe structure that improves an ability discharge condensed water with a simple structure.

An aspect relates to an exhaust pipe structure including a first pipe portion, a second pipe portion, and a third pipe portion. The first pipe portion causes exhaust gas to flow rearward of a vehicle, is arranged below a first panel of the vehicle, and extends in a horizontal direction in a vehicle side view. The second pipe portion communicates with a front end of the first pipe portion, causes exhaust gas from an engine to flow to the first pipe portion, and has a bottom portion recessed downward below a lower end of the front end and a top portion protruding downward below an upper end of the front end. The third pipe portion communicates with a rear end of the first pipe portion, causes exhaust gas from the first pipe portion to flow toward a muffler, and has a bottom portion recessed downward below a lower end of the rear end and atop portion protruding downward below an upper end of the rear end.

The aspect causes exhaust gas from the engine to flow toward the muffler from the second pipe portion through the first pipe portion and the third pipe portion.

When, for example, water vapor included in the exhaust gas flowing in the second pipe portion, the first pipe portion, and the third pipe portion is condensed by a decrease in temperature or the like while flowing in each pipe portion, condensed water is generated in each pipe portion, and the condensed water may pool in each pipe portion. Particularly, condensed water is likely to slightly pool in a bottom part from a first end of the first pipe portion to a second end thereof since the first pipe portion extends in the horizontal direction.

When the vehicle is forwardly inclined by, for example, traveling on an inclined ground, the condensed water slightly pooling in the bottom part of the first pipe portion moves to the bottom portion of the second pipe portion, which is recessed downward below the lower end of the front end of the first pipe portion, and pools in the bottom portion of the second pipe portion. When the condensed water pooling in the bottom portion of the second pipe portion reaches at least a height in the lower end of the front end of the first pipe portion, a channel cross-sectional area of the second pipe portion becomes smaller than a channel cross-sectional area of the first pipe portion since the top portion of the second pipe portion protrudes downward below the upper end of the front end of the first pipe portion. Accordingly, a flow rate of the exhaust gas passing above the condensed water is increased, and a negative pressure is generated in the second pipe portion. Thus, a surface of the condensed water rises. The rising surface of the condensed water forms a water membrane that closes a channel in the second pipe portion, and an exhaust pressure of the exhaust gas instantaneously rises. A rise in the exhaust pressure of the exhaust gas can drain the water membrane and the condensed water in each pipe portion including the second pipe portion at once.

When the vehicle is backwardly inclined by, for example, traveling on an inclined ground, the condensed water slightly pooling in the bottom part of the first pipe portion moves to the bottom portion of the third pipe portion, which is recessed downward below the lower end of the rear end of the first pipe portion, and pools in the bottom portion of the third pipe portion. When the condensed water pooling in the bottom portion of the third pipe portion reaches at least a height in the lower end of the rear end of the first pipe portion, a channel cross-sectional area of the third pipe portion becomes smaller than the channel cross-sectional area of the first, pipe portion since the top portion of the third pipe portion protrudes downward below the upper end of the rear end of the first pipe portion. Accordingly, the flow rate of the exhaust gas passing above the condensed water is increased, and a negative pressure is generated in the third pipe portion. Thus, the surface of the condensed water rises. The rising surface of the condensed water forms a water membrane that closes a channel in the third pipe portion, and the exhaust pressure of the exhaust gas instantaneously rises. An instant rise in the exhaust pressure of the exhaust gas can drain the water membrane and the condensed water in each pipe portion including the third pipe portion at once.

The aspect causes condensed water to locally pool and decreases a channel cross-sectional area of a pipe portion to form a water membrane, thereby improving the ability to drain condensed water.

The aspect improves the ability to drain condensed water through a study of a shape of the pipe portion in which a bottom portion recessed downward and a top portion protruding downward are formed in each of the second pipe portion and the third pipe portion and thus, can improve an ability to discharge condensed water pooling in an exhaust pipe with a simpler structure than, for example, a structure in which an exhaust pipe is divided into two channels and in which an on-off valve blocking one of the two channels is disposed (refer to JP 2015-158149 A).

In the exhaust pipe structure according to the aspect, the bottom portion of the second pipe portion may be recessed downward below an inner periphery at the lower end of the front end of the first pipe portion, and the top portion of the second pipe portion may protrude downward below an inner periphery at the upper end of the from end of the first pipe portion.

In the exhaust pipe structure according to the aspect, the top portion may be arranged above the inner periphery at the lower end of the front end of the first pipe portion.

In the exhaust pipe structure according to the aspect, the bottom portion of the second pipe portion may have a rear portion having a downslope forward of the vehicle from the from end of the first pipe portion and a front portion having an upslope forward of the vehicle from a front end of the rear portion of the bottom portion of the second pipe portion.

In the exhaust pipe structure according to the aspect, the bottom portion of the third pipe portion may be recessed downward below an inner periphery at the lower end of the rear end of the first pipe portion, and the top portion of the third pipe portion may protrude downward below an inner periphery at the upper end of the rear end of the first pipe portion.

In the exhaust pipe structure according to the aspect, the top portion may be arranged above the inner periphery at the lower end of the rear end of the first pipe portion.

In the exhaust pipe structure according to the aspect, the bottom portion of the third pipe portion may have a front portion having a downslope rearward of the vehicle from the rear end of the first pipe portion, a middle portion extending rearward of the vehicle horizontally from a rear end of the from portion, and a rear portion having an upslope rearward of the vehicle from a rear end of the middle portion (in the present specification, "horizontally" includes "approximately horizontally" in its meaning).

In the exhaust pipe structure according to the aspect, a length of the bottom portion of the second pipe portion in an axial direction of the bottom portion may be shorter than a length of the first pipe portion in an axial direction of the first pipe portion.

The aspect can further reduce a capacity of a pool of condensed water in the bottom portion of the second pipe portion than a stricture in which the length of the bottom portion in the axial direction of the bottom portion is longer than or equal to the length of the first pipe portion in the axial direction of the first pipe portion, since the length of the bottom portion of the second pipe portion in the axial direction of the bottom portion is shorter than the length of the first pipe portion in the axial direction of the first pipe portion. Thus, the channel cross-sectional area of the second pipe portion can be decreased with a small amount of condensed water, and the ability to drain condensed water is improved.

In the exhaust pipe structure according to the aspect, a length of the bottom portion of the third pipe portion in an axial direction of the bottom portion may be shorter than a length of the first pipe portion in an axial direction of the first pipe portion.

According to the aspect, the length of the bottom portion of the third pipe portion in the axial direction of the bottom portion is shorter than the length of the first pipe portion in the axial direction of the first pipe portion. Accordingly, a capacity of a pool of condensed water in the bottom portion of the third pipe portion can be further reduced than in a structure in which the length of the bottom portion in the axial direction of the bottom portion is longer than or equal to the length of the first pipe portion in the axial direction of the first pipe portion. Thus, the channel cross-sectional area of the third pipe portion can be decreased with a small amount of condensed water, and the ability to drain condensed water is improved.

The disclosure having the structure has an advantageous effect capable of improving an ability to discharge condensed water with a simple structure.

BRIEF DESCRIPTION OF THE DRAWINGS

Features, advantages, and technical and industrial significance of exemplary embodiments will be described below with reference to the accompanying drawings, which like numerals denote like elements, and wherein.

DETAILED DESCRIPTION OF EMBODIMENTS

Hereinafter, one example of an embodiment will be described based on the drawings. An arrow RR, an arrow UP, and an arrow LH illustrated in each drawing respectively indicate a direction rearward of a vehicle, a direction upward of the vehicle, and a direction rightward of the vehicle.

A "vehicle side view" used in the following description refers to a view seen from one side in a vehicle width direction to the other side thereof and includes a view seen through a part of the components. A "vehicle plan view" used in the following description refers to a view seen downward from above the vehicle and includes a view seen through a part of the components.

Exhaust Pipe Structure 10

First, an exhaust pipe structure 10 according to the present embodiment be described.

Figure 1:
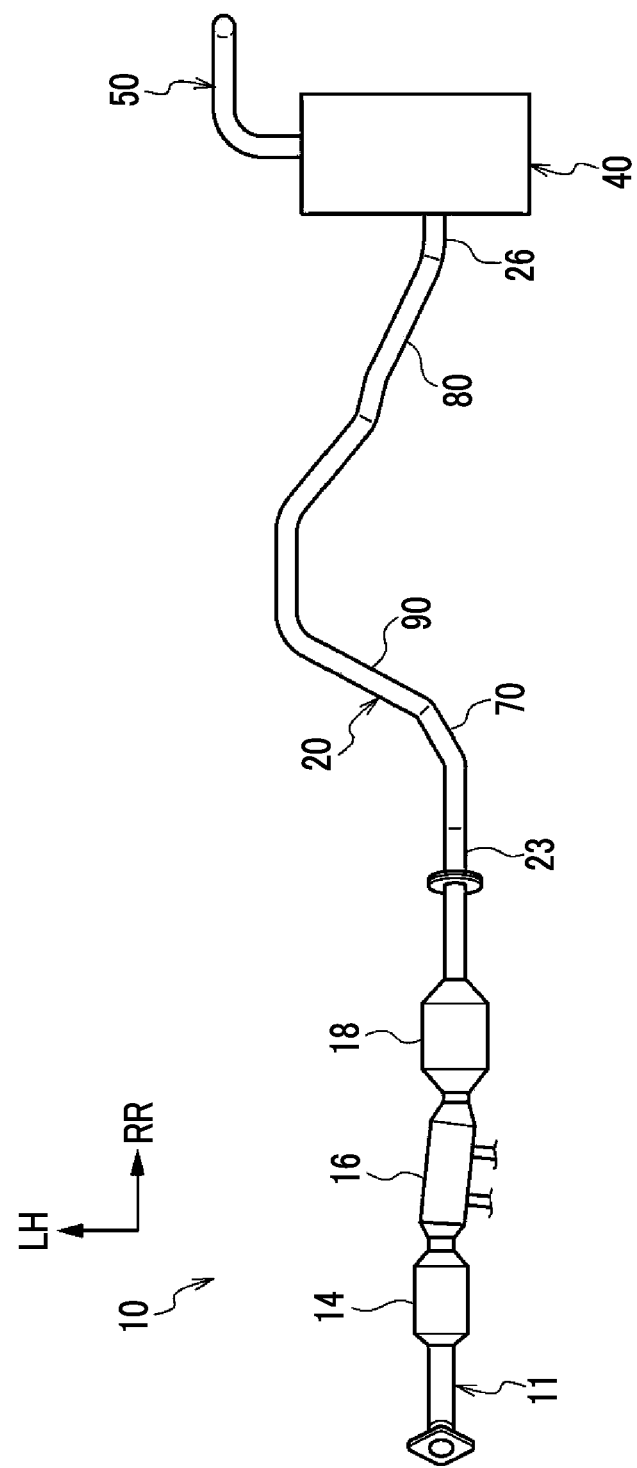
FIG. 1 is a plan view illustrating an exhaust pipe structure according to an embodiment.
Figure 2:
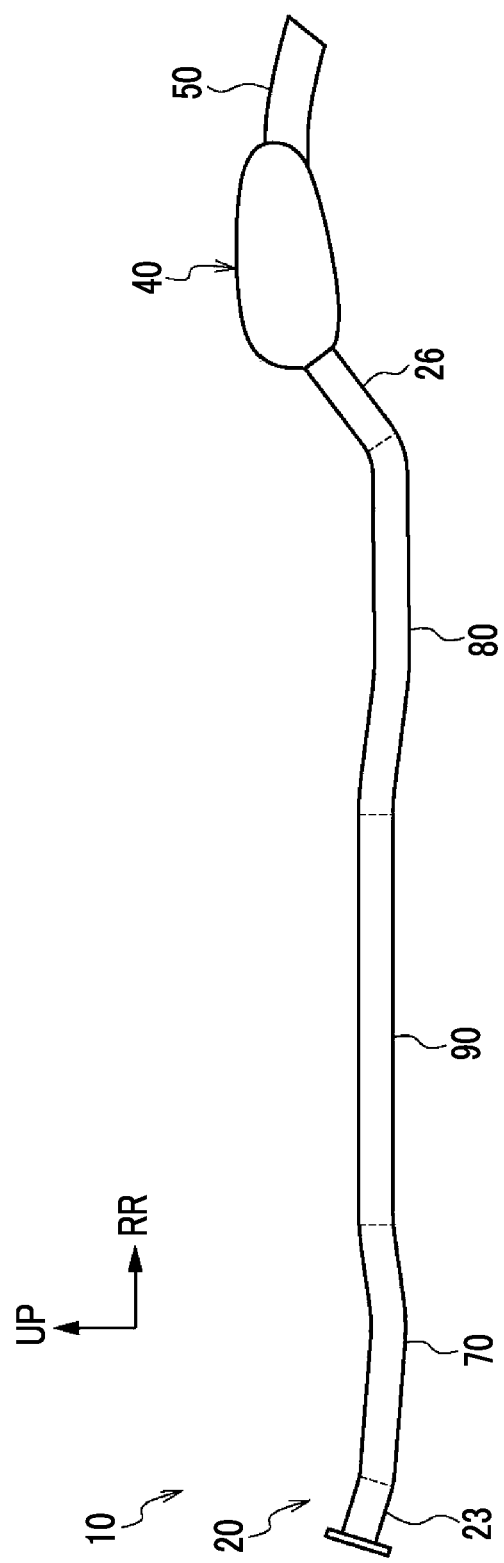
FIG. 2 is a side view illustrating a part of the exhaust pipe structure according to the embodiment.

FIG. 1 is a plan view illustrating the exhaust pipe structure 10. FIG. 2 is a side view illustrating a pan of the exhaust pipe structure 10. Each drawing including FIG. 1 and FIG. 2 illustrates a simplified structure in order to facilitate understanding of the exhaust pipe structure 10 according to the present embodiment.

The exhaust pipe structure 10 is a pipe structure that discharges exhaust gas discharged from an engine (not illustrated) to the atmosphere (outside the vehicle). Specifically, as illustrated in FIG. 1, the exhaust pipe structure 10 has a first exhaust pipe 11, a second exhaust pipe 20, a main muffler 40 (one example of a muffler), and a discharge pipe 50.

The first exhaust pipe 11 is a pipe that extends rearward of the vehicle as illustrated in FIG. 1. The front end, of the first exhaust pipe 11 is connected to the engine (not illustrated). Accordingly, exhaust gas from the engine flows from the front end of the first exhaust pipe 11 and flows rearward of the vehicle (to the rear end of the first exhaust pipe 11).

A catalytic converter 14, an exhaust heat collector 16, and a sub-muffler 18 are arranged in the first exhaust pipe 11 in this order rearward of the vehicle. The catalytic converter 14 functions to remove a specific substance from the exhaust gas passing the catalytic converter 14 and clean the exhaust gas.

The exhaust heat collector 16 functions to collect the heat of the exhaust gas by heat transfer between the exhaust gas and a heating medium such as water and reuse the heat. The sub-muffler 11 functions to reduce exhaust sound of the exhaust gas.

The second exhaust pipe 20 is a pipe that extends in the front-rear direction of the vehicle in the vehicle side view as illustrated in FIG. 2. The front end of the second exhaust pipe 20 is connected to the rear end of the first exhaust pipe 11 as illustrated in FIG. 1. Accordingly, exhaust gas from the first exhaust pipe 11 flows from the front end of the second exhaust pipe 20 and flows rearward of the vehicle no the rear end of the second exhaust pipe 20).

In the present embodiment, a part of the second exhaust pipe 20 bends toward one side in the vehicle width direction (for example, rightward of the vehicle) in the vehicle plan view as illustrated in FIG. 1. The second exhaust pipe 20 may have any shape in the vehicle plan view, provided that the second exhaust pipe 20 extends in the front-rear direction of the vehicle in the vehicle side view. A specific configuration of the second exhaust pipe 20 will be described below.

The main muffler 40 is arranged behind the second exhaust pipe 20 in the front-rear direction of the vehicle and above the second exhaust pipe 20 as illustrated in FIG. 2. The main muffler 40 communicates with the rear end of a second inclined portion 26 of the second exhaust pipe 20 described below. Accordingly, exhaust gas flows into the main muffler 40 from the second exhaust pipe 20. The main muffler 40 functions to reduce exhaust sound of the exhaust us flowing into the main muffler 40.

The discharge pipe 50 extends rightward of the vehicle from the main muffler 40 and is curved rearward of the vehicle. The discharge pipe 50 discharges exhaust gas to the atmosphere from the main muffler 40.

Specific Configuration of Second Exhaust Pipe 20

As illustrated in FIG. 2, the second exhaust pipe 20 has, specifically, a first inclined portion 23, a first recessed portion 70 (one example of a second pipe portion), a horizontal portion 90 (one example of a first pipe portion), a second recessed portion 80 (one example of a third pipe portion), and the second inclined portion 26.

The first inclined portion 23, the first recessed portion 70, the horizontal portion 90, the second recessed portion 80, and the second inclined portion 26 are arranged in this order rearward of the vehicle. The second exhaust pipe 20 has approximately the same inner diameter in each portion thereof including the first inclined portion 23, the first recessed portion 70, the horizontal portion 90, the second recessed portion 80, and the second inclined portion 26.

The horizontal portion 90 extends in the front-rear direction of the vehicle in the vehicle side view. Specifically, the horizontal portion 90 extends in an approximately horizontal direction in the vehicle side view. The second exhaust pipe 20 including the horizontal portion 90 is arranged below a floor panel (not illustrated) of the vehicle.

Figure 3:
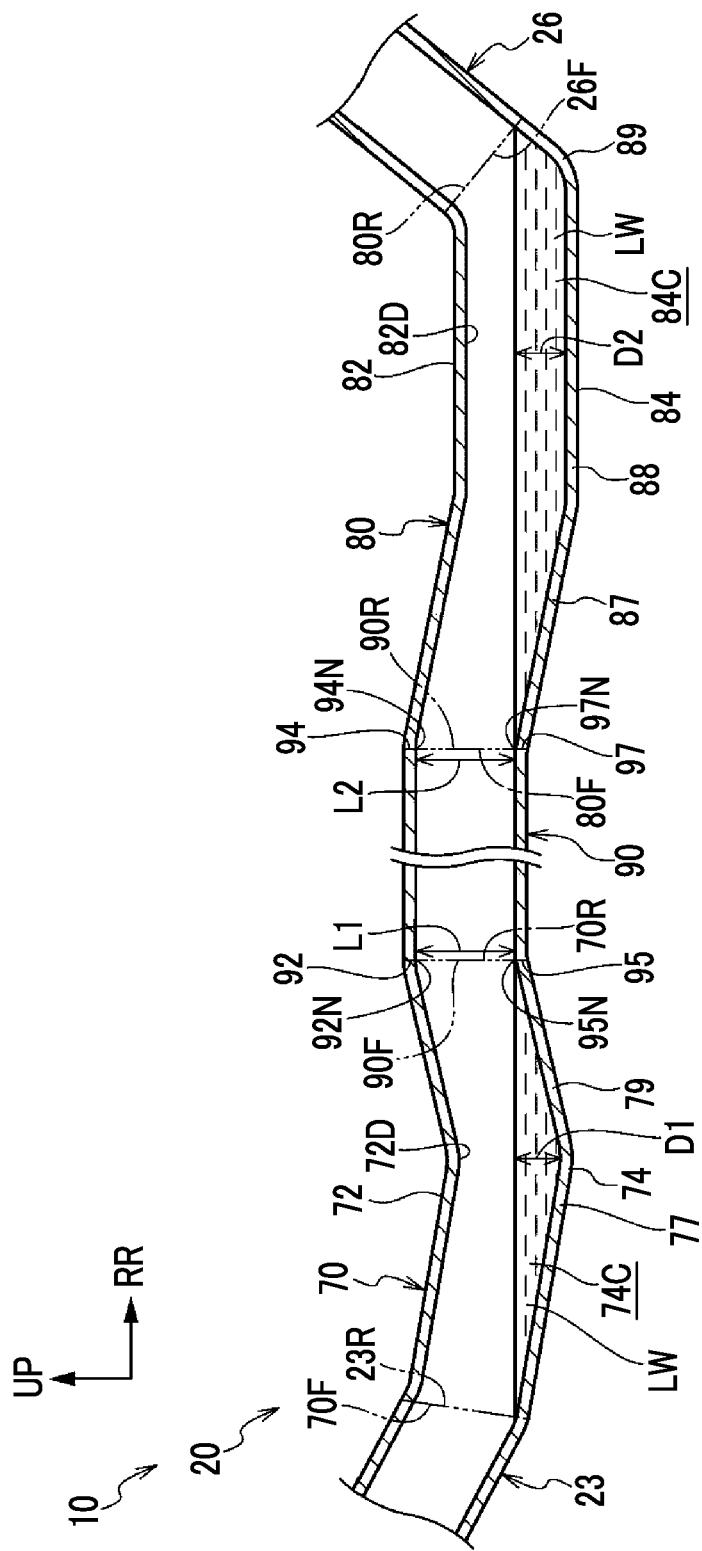
FIG. 3 is an enlarged side sectional view illustrating a part of structure illustrated in FIG. 2.

As illustrated in FIG. 3, a rear end 70R of the first recessed portion 70 communicates with a front end 90F of the horizontal portion 90. The length of the first recessed portion 70 in the axial direction thereof is shorter than the length of the horizontal portion 90 in the axial direction thereof (refer to FIG. 1 and FIG. 2). The first recessed portion 70 has, specifically, bottom portion 74 that is recessed downward below a lower end 95 of the front end 90F of the horizontal portion 90, and a top portion 72 that protrudes downward below an upper end 92 of the front end 90F of the horizontal portion 90.

The bottom portion 74 is a bottom part from a first end the first recessed portion 70 to a second end thereof in the axial direction thereof. The bottom pan means the lowest part in each position in the first recessed portion 70 in the axial direction thereof. The top portion top part from the first end of the first recessed portion 70 to the second end thereof in the axial direction thereof. The top part means the highest part in each position in the recessed portion 70 in the axial direction thereof.

The bottom portion 74 is, specifically, recessed downward below an inner periphery 95N at the lower end 95 of the front end 90F of the horizontal portion 90. The top portion 72, specifically, protrudes downward below an inner periphery 92N at the upper end 92 of the front end 90F of the horizontal portion 90.

The top portion is arranged above the inner periphery 95N at the lower end 95. That is, a lower end 72D of the top portion 72 is positioned above the inner periphery 95N at the lower end 95. In addition, the top portion 72, specifically, protrudes downward in an approximately triangular shape (approximately V-shape) in the vehicle side view. The bottom portion 74 is, specifically, recessed downward in an approximately triangular shape (approximately V-shape) in the vehicle side view. Accordingly, a space 74C having approximately triangular shape in the vehicle side view is formed in the bottom portion 74 in order to cause condensed water LW to pool.

The shapes of the bottom portion 74 and the top portion 72 are not limited to the approximately triangular shape (approximately V-shape) and can have various shapes. A maximum depth D1 of the space 74C is smaller than a length L1 from the inner periphery 92N to the inner periphery 95N (the inner diameter in the horizontal portion 90).

As described above, the top portion 72 protrudes downward in an approximately triangular shape, and the bottom portion 74 is recessed downward in an approximately triangular shape. Thus, a rear portion 79 of the first recessed portion 70 has at downslope forward of the vehicle from the front end 90F of the horizontal portion 90. A front portion 77 of the first recessed portion 70 has an upslope forward of the vehicle from the front end of the rear portion 79.

As illustrated in FIG. 3, a rear end 23R of the first inclined portion 23 communicates with a front end 70F of the first recessed portion 70. The first inclined portion 23 has an upslope forward of the vehicle from the from end 70F of the first recessed portion 70. The upslope is steeper than the upslope in the front portion 77 of the first recessed portion 70. The front end of the first inclined portion 23 is connected to the rear end of the first exhaust pipe 11, as illustrated in FIG. 1, thereby communicating with the first exhaust pipe 11.

As illustrated in FIG. 3, a front end 80F of the second recessed portion 80 communicates with a rear end 90R of the horizontal portion 90. The length of the second recessed portion 80 in the axial direction thereof is shorter than the length of the horizontal portion 90 in the axial direction thereof (refer to FIG. 1 and FIG. 2). The second recessed portion 80 has, specifically, a bottom portion 84 that is recessed downward below a lower end 97 of the rear end 90R of the horizontal portion 90, and a top portion 82 that protrudes downward below an upper end 94 of the rear end 90R of the horizontal portion 90.

The bottom portion 84 is a bottom part from a first end of the second recessed portion 80 to a second end thereof in the axial direction thereof. The bottom part means the lowest part in each position in the second, recessed portion 80 in the axial direction thereof. The top portion 82 is a top part from the first end of the second recessed portion 80 to the second end thereof in the axial direction thereof. The top part means the highest pan in each position in the second recessed portion 80 in the axial direction thereof.

The bottom portion 84 is, specifically, recessed downward below an inner periphery 97N at the lower end 97 of the rear end 90R of the horizontal portion 90. The top portion 82, specifically, protrudes downward below an inner periphery 94N at the upper end 94 of the rear end 90R of the horizontal portion 90.

The top portion 82 is arranged above the inner periphery 97N at the lower end 97. That is, a lower end 82D of the top portion 82 is positioned above the inner periphery 97N at the lower end 97. In addition, the top portion 82, specifically, protrudes downward in an approximately trapezoidal shape in the vehicle side view. The bottom portion 84 is, specifically, recessed downward in an approximately trapezoidal shape in the vehicle side view. Accordingly, a space 84C having an approximately trapezoidal shape in the vehicle side view is formed in the bottom portion 84 in order to cause the condensed water LW to pool.

The shapes of the bottom portion 84 and the top portion 82 are not limited to the approximately trapezoidal shape and can have various shapes. A maximum depth D2 of the space 84C is smaller than a length L2 from the inner periphery 94N to the inner periphery 97N (the inner diameter in the horizontal portion 90).

As described above, the top portion 82 protrudes downward in an approximately trapezoidal shape, and the bottom portion 84 is recessed downward in an approximately trapezoidal shape. Thus, a from portion 87 of the second recessed portion 80 has a downslope rearward of the vehicle from the rear end 90R of the horizontal portion 90. A middle portion 88 of the second recessed portion 80 extends rearward of the vehicle approximately horizontally from the rear end of the front portion 87. A rear portion 89 of the second recessed portion 80 has an upslope rearward of the vehicle from the rear end of the middle portion 88.

As illustrated in FIG. 3, a front end 26F of the second inclined portion 26 communicates with a rear end 80R of the second recessed portion 80. The second inclined portion 26 has an upslope rearward of the vehicle from the rear end 80R of the second recessed portion 80. The upslope is equivalent to the upslope in the rear portion 89 of the second recessed portion 80. The rear end of the second inclined portion 26 communicates with the main muffler 40 as described above (refer to FIG. 1).

EFFECT OF PRESENT EMBODIMENT

Next, an effect of the present embodiment will be described.

Exhaust gas discharged from the engine (not illustrated) passes the first exhaust pipe the second exhaust pipe 20, the main muffler 40, and the discharge pipe 50 and is discharged to the atmosphere (refer to FIG. 1). When, for example, water vapor included in the exhaust gas flowing in the second exhaust pipe 20 is condensed by a decrease in temperature or the like while flowing in the second exhaust pipe 20, the condensed water LW (refer to FIG. 3) is generated in the second exhaust pipe 20, and the condensed water LW may pool in the second exhaust pipe 20. Particularly, in the present embodiment, the exhaust heat collector 16 collects the heat of the exhaust gas and thereby decreases the temperature of the exhaust gas. Thus, condensation of water vapor is likely to occur.

When the vehicle is in n horizontal state, the condensed water LW generated in the second exhaust pipe 20 pools in the space 74C of the first recessed portion 70, in the horizontal portion 90, and in the space 84C of the second recessed portion 80. Particularly, condensed water is likely to slightly pool in a bottom part from a first end of the horizontal portion 90 to a second end thereof since the horizontal portion 90 extends in the horizontal direction.

When the vehicle is forwardly inclined by, for example, traveling on an inclined around or stopping on an inclined ground, the condensed water LW slightly pooling in the bottom part of the horizontal portion 90 of the second exhaust pipe 20 moves to the apace 74C of the first recessed portion 70 of the second exhaust pipe 20, Depending on the angle of forward inclination of the vehicle, the condensed water LW pooling in the space 84C of the second recessed portion 80 moves to the space 74C of the first recessed portion 70.

The condensed water LW gathers in the space 74C of the first recessed portion 70, and the condensed water LW pools in the space 74C as illustrated in FIG. 3. When the condensed water LW pooling in the space 74C reaches at least the height (height illustrated in FIG. 3) in the lower end 95 (specifically, the inner periphery 95N) at the front end 90F of the horizontal portion 90, the channel cross-sectional area of the first recessed portion 70 becomes smaller than the channel cross-sectional area of the horizontal portion 90 since the top portion 72 protrudes downward below the upper end 92 of the front end 90F of the horizontal portion 90. Accordingly, the flow rate of the exhaust gas passing above the condensed water LW is increased, and a negative pressure is generated in the first recessed portion 70. Thus, the surface of the condensed water LW rises. The rising surface of the condensed water LW forms a water membrane that closes the channel in the first recessed portion 70, and the exhaust pressure of the exhaust gas instantaneously rises. A rise in the exhaust pressure of the exhaust gas drains the water membrane and the condensed water LW in the second exhaust pipe 20 including the condensed water LW in the space 74C at once.

When the vehicle is backwardly inclined by, for example, traveling on an inclined ground or stopping on an inclined the condensed water LW slightly ground pooling in the bottom part of the horizontal portion 90 of the second exhaust pipe 20 moves to the space 84C of the second recessed portion 80 of the second exhaust pipe 20. Depending on the angle of backward inclination of the vehicle, the condensed water LW pooling in the space 74C of the first recessed portion 70 moves to the space 84C of the second recessed portion 80.

The condensed water LW gathers in the space 84C of the second recessed portion 80, and the condensed water LW pools in the space 84C as illustrated in FIG. 3. When the condensed water LW pooling in the space 84C reaches at least the height (height illustrated in FIG. 3) in the lower end 97 (specifically, the inner periphery 97N) of the rear end 90R of the horizontal portion 90, the channel cross-sectional area of the second recessed portion 80 becomes smaller than the channel cross-sectional area of the horizontal portion 90 since the top portion 82 protrudes downward below the upper end 94 of the rear end 90R of the horizontal portion 90. Accordingly, the flow rate of the exhaust gas passing above the condensed water LW is increased, and at negative pressure is generated in the second recessed portion 80. Thus, the surface of the condensed water LW rises. The rising surface of the condensed water LW forms a water membrane that closes the channel in the second recessed portion 80, and the exhaust pressure of the exhaust gas instantaneously rises. A rise in the exhaust pressure of the exhaust gas drains the water membrane and the condensed water LW in the second exhaust pipe 20 including the condensed water LW in the space 84C at once.

As described heretofore, the present embodiment causes the condensed water LW to locally pool by using the fact that the condensed water LW moves to the first recessed portion 70 or the second recessed portion 80 when the vehicle is forwardly inclined or backwardly inclined. Accordingly, the present embodiment decreases the cross-sectional area of the second exhaust pipe 20 to form a water membrane, thereby improving an ability to drain the condensed water LW.

The present embodiment improves the ability to drain the condensed water LW through a study of the shape of the second exhaust pipe 30 in which the first recessed portion 70 and the second recessed portion 80 are formed in the second exhaust pipe 20. Accordingly, the present embodiment can improve the ability to discharge the condensed water LW pooling in the second exhaust pipe 20 with a simpler configuration than, for example, a structure in which the second exhaust pipe 20 is divided into two channels and in which an on-off valve blocking one of the two channels is disposed (refer to JP 2015-158149 A).

When one of the first recessed portion 70 and the second recessed portion 80 is formed, the condensed water LW is drained in one of the cases of forward inclination of the vehicle and backward inclination of the vehicle. Meanwhile, the present embodiment can drain the condensed water LW when the vehicle is forwardly inclined or backwardly inclined, since the first recessed portion 70 and the second recessed portion 80 are formed.

In the present embodiment, the length of the first recessed portion 70 in the axial direction thereof is shorter than the length of the horizontal portion 90 in the axial direction thereof. Accordingly, the present embodiment can further reduce the capacity of the pool of the condensed water LW in the space 74C of the first recessed portion 70 than a structure in which the length of the first recessed portion 70 in the axial direction thereof is longer than or equal to the length of the horizontal portion 90 direction thereof. Thus, the channel cross-sectional area of the first recessed portion 70 can be decreased with a small amount of the condensed water LW, and the ability to drain the condensed water is improved.

In the present embodiment, the length of the second recessed portion 80 in the axial direction thereof is shorter than the length of the horizontal portion 90 in the axial direction thereof. Accordingly, the present embodiment can further reduce the capacity of the pool of the condensed water LW in the apace 84C of the second recessed portion 80 than a structure in which the length of the second recessed portion 80 in the axial direction thereof is longer than or equal to the length of the horizontal portion 90 in the axial direction thereof. Thus, the channel cross-sectional area of the second recessed portion 80 can be decreased with a small amount of the condensed water LW and the ability to drain the condensed water is improved.

The disclosure is not limited to the embodiment. Various modifications, changes, and improvements can be made to the extent not departing from the gist of the disclosure.

What is claimed is:

1. An exhaust pipe structure comprising:
    a first pipe portion through which exhaust gas flows rearward of a vehicle, the first pipe portion being arranged below a floor panel of the vehicle and extending in a horizontal direction in a vehicle side view;
    a second pipe portion configured to communicate with a front end of the first pipe portion and through which exhaust gas flows from an engine to the first pipe portion, the second pipe portion having a bottom portion recessed downward so as to be disposed below a lower end of the front end of the first pipe portion and a top portion protruding downward so as to be disposed below an upper end of the front end of the first pipe portion; and
    a third pipe portion configured to communicate with a rear end of the first pipe portion and through which exhaust gas flows from the first pipe portion toward a muffler, the third pipe portion having a bottom portion recessed downward so as to be disposed below a lower end of the rear end of the first pipe portion and a top portion protruding downward so as to be disposed below an upper end of the rear end of the first pipe portion,
    wherein a length of the bottom portion of the second pipe portion in an axial direction of the bottom portion is shorter than a length of the first pipe portion in an axial direction of the first pipe portion, and
    wherein the muffler is only provided at a downstream side of the third pipe portion, and the first pipe portion is free of any muffler.

2. The exhaust pipe structure according to claim 1, wherein:
    the bottom portion of the second pipe portion is recessed downward so as to be disposed below an inner periphery at the lower end of the front end of the first pipe portion; and
    the top portion of the second pipe portion protrudes downward so as to be disposed below an inner periphery at the upper end of the front end of the first pipe portion.

3. The exhaust pipe structure according to claim 2, wherein the top portion is arranged above the inner periphery at the lower end of the front end of the first pipe portion.

4. The exhaust pipe structure according to claim 1, wherein the bottom portion of the second pipe portion has
    a rear portion having a downslope toward a front of the vehicle from the front end of the first pipe portion, and
    a front portion having an upslope toward the front of the vehicle from a front end of the rear portion of the bottom portion of the second pipe portion.

5. The exhaust pipe structure according to claim 1, wherein:
    the bottom portion of the third pipe portion is recessed downward so as to be disposed below an inner periphery at the lower end of the rear end of the first pipe portion; and
    the top portion of the third pipe portion protrudes downward so as to be disposed below an inner periphery at the upper end of the rear end of the first pipe portion.

6. The exhaust pipe structure according to claim 5, wherein the top portion is arranged above the inner periphery at the lower end of the rear end of the first pipe portion.

7. The exhaust pipe structure according to claim 1, wherein the bottom portion of the third pipe portion has
    a front portion having a downslope toward a rear of the vehicle from the rear end of the first pipe portion,
    a middle portion extending toward the rear of the vehicle horizontally from a rear end of the front portion, and
    a rear portion having an upslope toward the rear of the vehicle from a rear end of the middle portion.

8. The exhaust pipe structure according to claim 1, further comprising another exhaust pipe connected to and communicating with a front end of the second pipe portion, a sub-muffler being arranged between a front end of the another exhaust pipe and a rear end of the another exhaust pipe.

9. An exhaust pipe structure comprising:
a first pipe portion through exhaust gas flows rearward of a vehicle, the first pipe portion being arranged below a floor panel of the vehicle and extending in a horizontal direction in a vehicle side view;
a second pipe portion configured to communicate with a front end of the first pipe portion and through which exhaust gas flows from an engine to the first pipe portion, the second pipe portion having a bottom portion recessed downward so as to be disposed below a lower end of the front end of the first pipe portion and a top portion protruding downward so as to be disposed below an upper end of the front end of the first pipe portion; and
a third pipe portion configured to communicate with a rear end of the first pipe portion and through which exhaust gas flows from the first pipe portion toward a muffler, the third pipe portion having a bottom portion recessed downward so as to be disposed below a lower end of the rear end of the first pipe portion and a top portion protruding downward so as to be disposed below an upper end of the rear end of the first pipe portion,
wherein a length of the bottom portion of the third pipe portion in an axial direction of the bottom portion is shorter than a length of the first pipe portion in an axial direction of the first pipe portion, and
wherein the muffler is only provided at a downstream side of the third pipe portion, and the first pipe portion is free of any muffler.

10. The exhaust pipe structure according to claim 9, wherein:
the bottom portion of the second pipe portion is recessed downward so as to be disposed below an inner periphery at the lower end of the front end of the first pipe portion; and
the top portion of the second pipe portion protrudes downward so as to be disposed below an inner periphery at the upper end of the front end of the first pipe portion.

11. The exhaust pipe structure according to claim 10, wherein the top portion is arranged above the inner periphery at the lower end of the front end of the first pipe portion.

12. The exhaust pipe structure according to claim 9, wherein the bottom portion of the second pipe portion has
a rear portion having a downslope toward a front of the vehicle from the front end of the first pipe portion, and
a front portion having an upslope toward the front of the vehicle from a front end of the rear portion of the bottom portion of the second pipe portion.

13. The exhaust pipe structure according to claim 9, wherein:
the bottom portion of the third pipe portion is recessed downward so as to be disposed below an inner periphery at the lower end of the rear end of the first pipe portion; and
the top portion of the third pipe portion protrudes downward so as to be disposed below an inner periphery at the upper end of the rear end of the first pipe portion.

14. The exhaust pipe structure according to claim 13, wherein the top portion is arranged above the inner periphery at the lower end of the rear end of the first pipe portion.

15. The exhaust pipe structure according to claim 9, wherein the bottom portion of the third pipe portion has
a front portion having a downslope toward a rear of the vehicle from the rear end of the first pipe portion,
a middle portion extending toward the rear of the vehicle horizontally from a rear end of the front portion, and
a rear portion having an upslope toward the rear of the vehicle from a rear end of the middle portion.

16. The exhaust pipe structure according to claim 9, further comprising another exhaust pipe connected to and communicating with a front end of the second pipe portion, a sub-muffler being arranged between a front end of the another exhaust pipe and a rear end of the another exhaust pipe.

* * * * *